US009969332B1

(12) United States Patent
Pertsel et al.

(10) Patent No.: US 9,969,332 B1
(45) Date of Patent: May 15, 2018

(54) REDUCTION OF LED HEADLIGHT FLICKERING IN ELECTRONIC MIRROR APPLICATIONS

(71) Applicant: Ambarella, Inc., Santa Clara, CA (US)

(72) Inventors: Shimon Pertsel, Mountain View, CA (US); Christopher N. Day, Los Gatos, CA (US); Alexander Fink, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 355 days.

(21) Appl. No.: 14/729,332

(22) Filed: Jun. 3, 2015

(51) Int. Cl.
*B60R 1/00* (2006.01)
*G06K 9/00* (2006.01)
*G06K 9/20* (2006.01)

(52) U.S. Cl.
CPC .......... *B60R 1/005* (2013.01); *G06K 9/00825* (2013.01); *G06K 9/2027* (2013.01)

(58) Field of Classification Search
CPC ..... G09G 2320/0247; G09G 2320/064; G09G 3/2018; G09G 2320/10; G09G 3/342; G09G 3/3426; G09G 2310/0237; G09G 2320/0261; G09G 2320/103; H04N 9/315; H04N 9/3129; H04N 9/3114; H04N 5/357; H04N 5/217; H04N 5/2176; H04N 5/2353; H04N 5/235; H04N 5/58; H04N 7/18; H04B 10/516; H04B 10/116; G06K 9/00825; G06K 9/00791; G06K 9/00818; G06K 9/20127; B60R 2300/30; B60R 2300/8046; B60R 1/00; B60R 2300/8026; B60R 1/06; B60R 1/005; G01J 2001/4247; G01J 1/044; G01J 1/18; G01J 1/04; G01J 2001/0276; G01J 1/0488; G01J 1/4228; F21Y 2115/10; B06Q 1/04; B06Q 1/085; B06Q 1/1423; G06T 5/50; G06T 7/97; G06T 7/20
See application file for complete search history.

(56) References Cited

U.S. PATENT DOCUMENTS

| 8,493,302 | B2* | 7/2013 | Sekine | G09G 3/3611 |
| | | | | 345/100 |
| 9,473,706 | B2* | 10/2016 | Malone | H04N 5/2357 |
| 2010/0037373 | A1* | 2/2010 | Macknik | G01J 1/04 |
| | | | | 2/426 |
| 2013/0155239 | A1* | 6/2013 | Moore | H04N 5/335 |
| | | | | 348/148 |
| 2014/0186026 | A1* | 7/2014 | Oshima | H04B 10/116 |
| | | | | 398/25 |

(Continued)

*Primary Examiner* — Dramos I Kalapodas
(74) *Attorney, Agent, or Firm* — Christopher P. Maiorana, PC

(57) ABSTRACT

An apparatus comprising a sensor and a processor. The sensor may be configured to generate a first video signal based on a targeted view from a vehicle. The processor may be configured to classify objects detected in the first video signal. The processor may be configured to generate a second video signal in response to (i) the classified objects and (ii) the first video signal. The second video signal may present a field of view configured to fit a shape of a display emulating a reflective view from a mirror. The second video signal may present a modified group of pixels of the first video signal to mask a flickering effect of the classified objects present in the first video signal when viewing the second video signal on the display.

17 Claims, 9 Drawing Sheets

(56) References Cited

U.S. PATENT DOCUMENTS

2014/0253754 A1* 9/2014 Papiashvili .......... H04N 5/2357
                                                     348/226.1
2015/0130853 A1* 5/2015 Hada .................... H04N 9/3155
                                                     345/690
2017/0148148 A1* 5/2017 Okuyama ................. G06T 5/50

* cited by examiner

US 9,969,332 B1

REDUCTION OF LED HEADLIGHT FLICKERING IN ELECTRONIC MIRROR APPLICATIONS

FIELD OF THE INVENTION

The present invention relates to video capture devices generally and, more particularly, to a reduction of LED headlight flickering in electronic mirror applications.

BACKGROUND OF THE INVENTION

For certain light sources, such as LED or Fluorescent sources, the peak brightness is fixed and cannot be modulated. Manufacturers of light sources with fixed brightness dim the brightness of the light source by shortening the duty cycle. The duty cycle of the light source is kept on for a part of the cycle, and off for the rest of the cycle. A typical LED cycle frequency is in the 300-700 Hz range. However, there is no standardized LED cycle frequency.

In current electronic display applications there may be a problem with flickering when displaying images of light sources. LED light sources are pulsed to turn on and off many times per second. Specifically, flickering happens when there is a camera exposure that is shorter than a LED cycle length (i.e., when using multiple-exposure High-Dynamic-Range (HDR) to capture a high dynamic range scene or when using short exposure to capture ultra-bright conditions). Furthermore, there is no current industry standard for the frequency or duty cycle of pulsing for LEDs. Therefore, designing an electronic display capable of handling a specific frequency or duty cycle is impractical.

It would be desirable to implement a reduction of LED headlight flickering in electronic mirror applications.

SUMMARY OF THE INVENTION

The present invention concerns an apparatus comprising a sensor and a processor. The sensor may be configured to generate a first video signal based on a targeted view from a vehicle. The processor may be configured to classify objects detected in the first video signal. The processor may be configured to generate a second video signal in response to (i) the classified objects and (ii) the first video signal. The second video signal may present a field of view configured to fit a shape of a display emulating a reflective view from a mirror. The second video signal may present a modified group of pixels of the first video signal to mask a flickering effect of the classified objects present in the first video signal when viewing the second video signal on the display.

The objects, features and advantages of the present invention include providing a reduction of LED headlight flickering in electronic mirror applications that may (i) analyze video images for pulsed light sources, (ii) leaving pixels unmodified for a subset of objects based on a criteria indicating that the subset of objects is known to be intentionally flickering, (iii) classify detected objects, (iv) mask flickering in a processor domain, (v) mask flickering in a sensor domain, (vi) mask flickering at a display device, (vii) display a version of the captured video signal with modified pixels, (viii) determine average values over consecutive frames, (ix) modify a gain of a group of pixels on a frame-by-frame basis, (x) increase a shortest exposure for a group of pixels and/or (xi) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
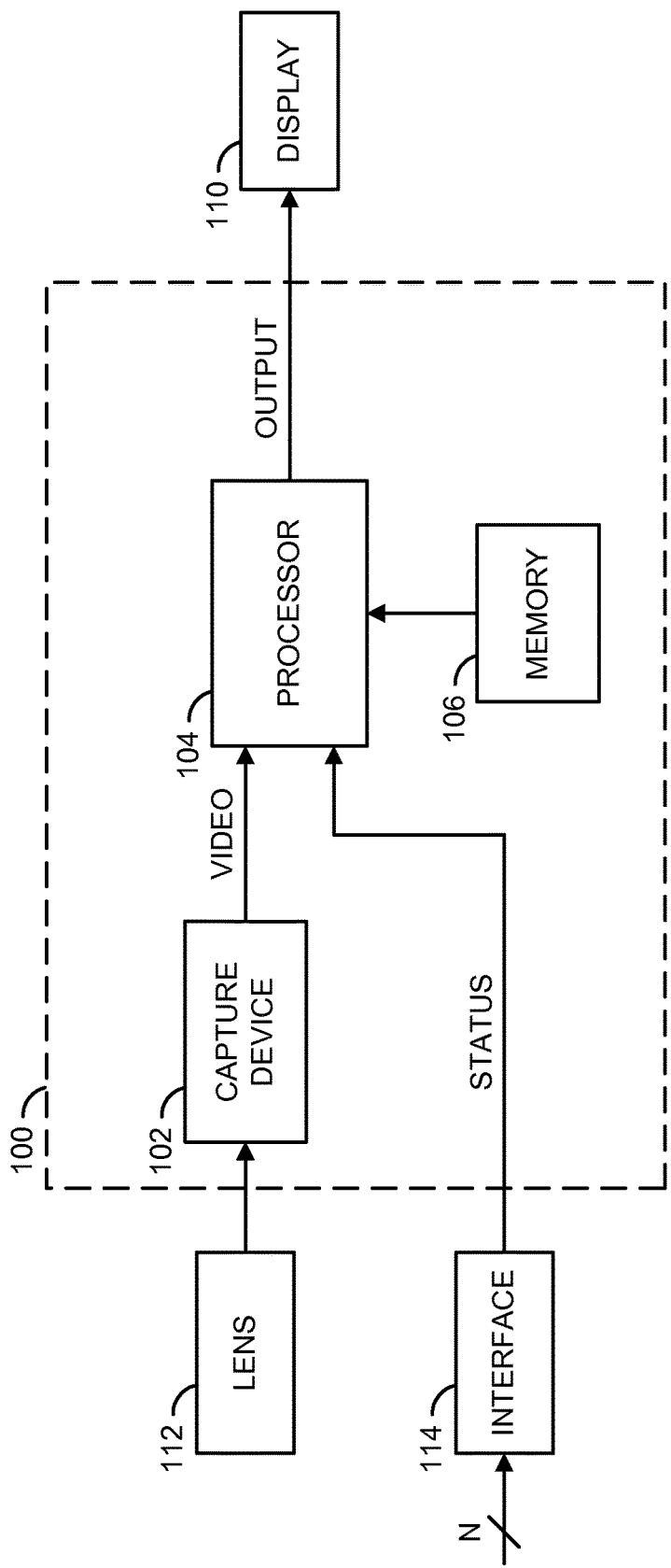
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, a block (or circuit) 104, and/or a block (or circuit) 106. The circuit 102 may be configured as a capture device. The circuit 104 may be configured as a processor. The circuit 106 may be configured as a memory. The camera system 100 is shown connected to a block (or circuit) 110. The circuit 110 may be a display device. In some embodiments, the display device 110 may be implemented as part of the camera system 100. The display device 110 may be implemented as an electronic mirror (e.g., a rearview mirror and/or a sideview mirror). In some embodiments, multiple display devices 110 may be implemented.

The camera system 100 is shown receiving input from a block (or circuit) 112. The block 112 may be a lens (e.g., a camera lens). In some embodiments, the lens 112 may be implemented as part of the camera system 100. The camera system 100 is shown receiving input from a block (or circuit) 114. The circuit 114 may be an interface. The interface 114 may receive input from various vehicle sensors. In some embodiments, the camera system 100 may be implemented as a drop-in solution (e.g., installed as one component).

The capture device 102 may present a signal (e.g., VIDEO) to the processor 104. The interface 114 may present a signal (e.g., STATUS) to the processor 104. The number and/or types of signals presented by the interface 114 may be varied according to the design criteria of a particular implementation. The processor 104 may be configured to receive the signal VIDEO and/or the signal STATUS. The processor 104 may be configured to generate a signal (e.g., OUTPUT). The signal OUTPUT may be a modified version of the signal VIDEO. The inputs, outputs and/or arrangement of the components of the camera system 100 may be varied according to the design criteria of a particular implementation.

Figure 2:
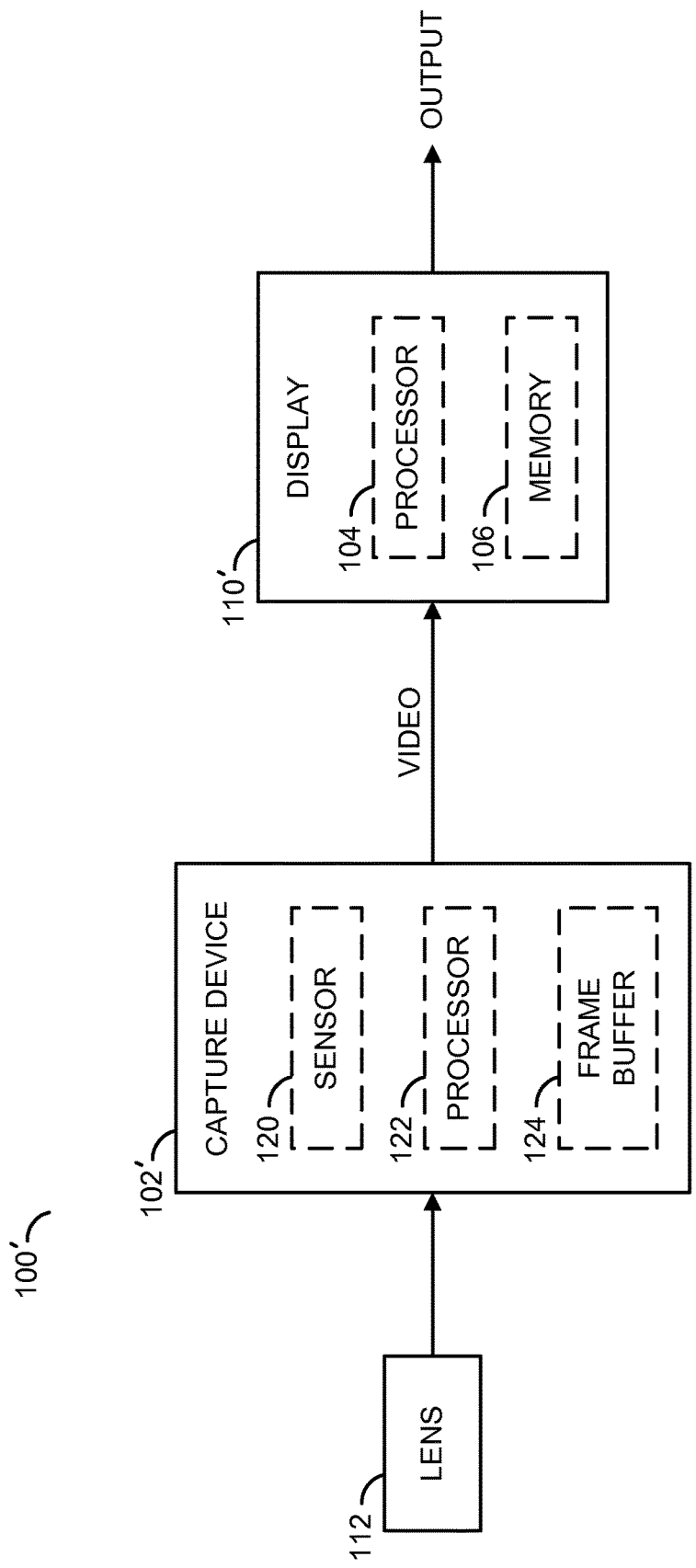
FIG. 2 is a block diagram of another example embodiment of an apparatus.

Referring to FIG. 2, a block diagram of an apparatus 100' is shown in accordance with an embodiment of the present invention. The camera system 100' may comprise the capture device 102', the display device 110' and/or the lens 112. The camera system 100' may be a distributed system (e.g., each component may be implemented separately throughout a vehicle). The capture device 102' may comprise a block (or circuit) 120, a block (or circuit) 122 and/or a block (or circuit) 124. The circuit 120 may be a sensor. The circuit 122 may be a processor (e.g., a processor separate from the processor 104). The circuit 124 may be a frame buffer. The capture device 102' may implement a separate internal memory (e.g., a memory separate from the memory 106 such as the frame buffer 124). The capture device 102' may be configured to present the signal VIDEO to the display device 110'.

The display device 110' may comprise the processor 104 and the memory 106. The display device 110' may receive the signal VIDEO from the capture device 102'. The display device 110' may be configured as an electronic mirror. The display device 110' may display the signal OUTPUT. In some embodiments, the capture device 102' may present the signal OUTPUT to the display device 110' and the display device 110' may display the signal OUTPUT (e.g., without performing any processing on the signal OUTPUT).

Figure 3:
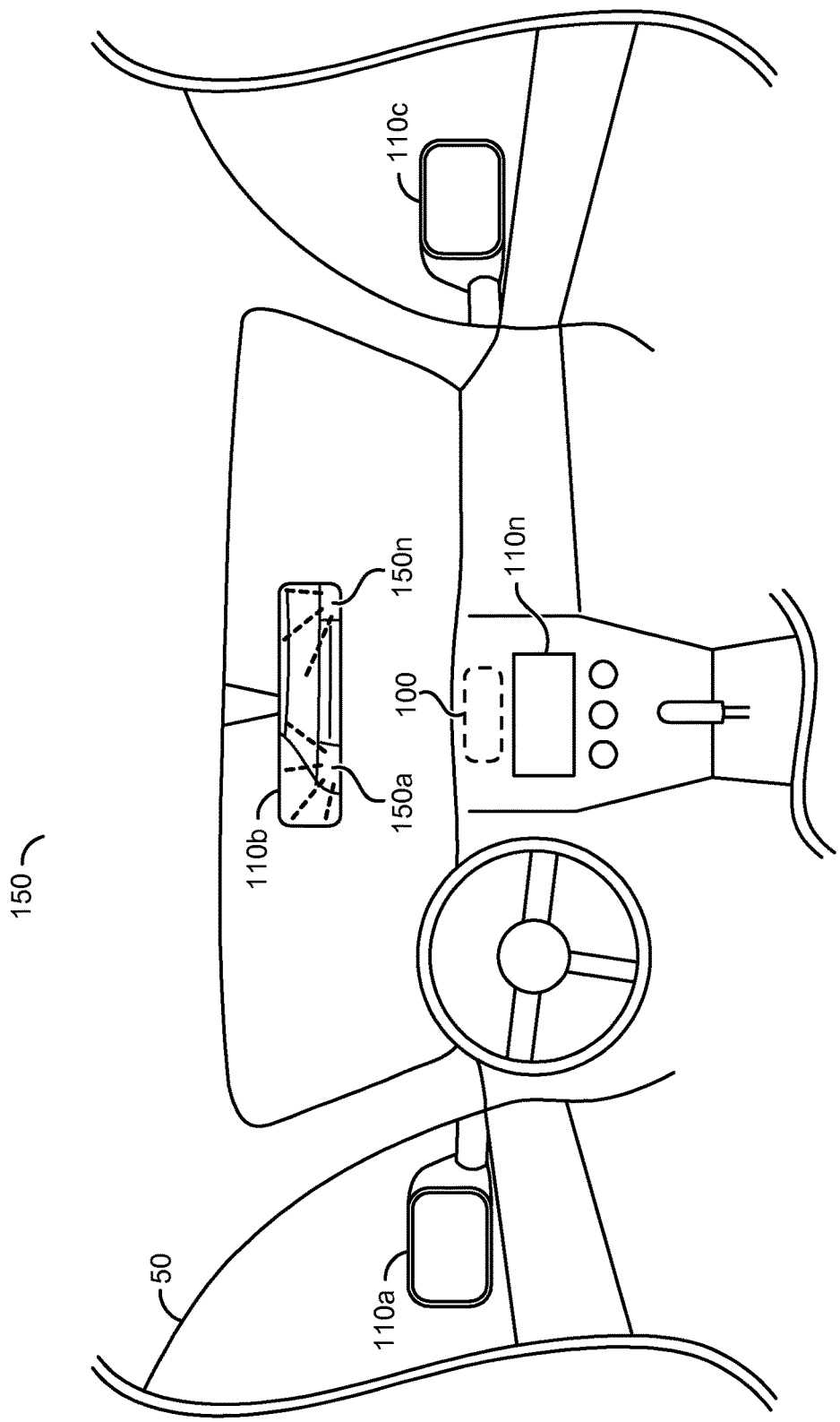
FIG. 3 is a diagram illustrating electronic mirrors displaying a pulsed light source in a vehicle.

Referring to FIG. 3, an interior example 150 of electronic mirrors displaying a pulsed light source in a vehicle 50 is shown. The camera system 100 is shown in the vehicle 50 (e.g., mounted in or on the dashboard of the vehicle 50). In one example, the camera system 100 may be located in the rear of the vehicle 50 (e.g., the capture device 102 may be at the rear of the vehicle 50 to capture objects behind the vehicle 50). In another example, the camera system 100 (or the camera system 100') may be distributed throughout the vehicle 50 (e.g., connections may be implemented between the camera system 100 and the capture device 102 such as a direct wired connection and/or a connection using a common bus line). The location of the camera system 100 may be varied according to the design criteria of a particular implementation. The interior of the vehicle 50 is shown having display devices 110a-110n. The display devices 110a-110n may be implemented as electronic mirrors.

In the example shown, the display device 110a may be implemented as a sideview electronic mirror on the driver side of the vehicle 50, the display device 110b may be implemented as a rearview electronic mirror of the vehicle 50, the display device 110c may be implemented as a sideview electronic mirror on the passenger side of the vehicle 50 and/or the display device 110n may be implemented as an infotainment unit of the vehicle 50. In some embodiments, the display device 110n may be implemented to display a low-angle rear view of the vehicle 50 (e.g., a display for a back-up/reverse camera). The number of display devices 110a-110n, the type of display devices 110a-110n and/or the image/video displayed on the display devices 110a-110n may be varied according to the design criteria of a particular implementation.

The rearview electronic mirror 110b is shown displaying detected objects 150a-150n. The detected objects 150a-150n may be pulsed light sources. For example, the detected objects 150a-150n may be LED headlights from another vehicle. The types of detected objects 150a-150n may be varied according to the design criteria of a particular implementation.

An electronic mirror (e.g., the displays 110a-110n) may be used as a replacement for a regular reflective glass mirror (e.g., in automotive applications, in bicycle application, in powered chair applications, etc.). In automotive applications, one or more of the capture device 102 (e.g., a camera) may be implemented to capture video from a rear, front and/or sides of the vehicle 50 (e.g., a targeted view from the vehicle 50). The video image may be displayed to a driver on the display devices 110a-110n (e.g., an LCD display implemented as an electronic mirror). The electronic mirrors 110a-110n may provide advantages compared to conventional reflective mirrors. For example, the electronic mirrors 110a-110n may provide a greater field of view, provide visual aids (e.g., night vision), provide alternate angles, provide zoomed in views and/or be implemented as a smaller size.

Figure 4:
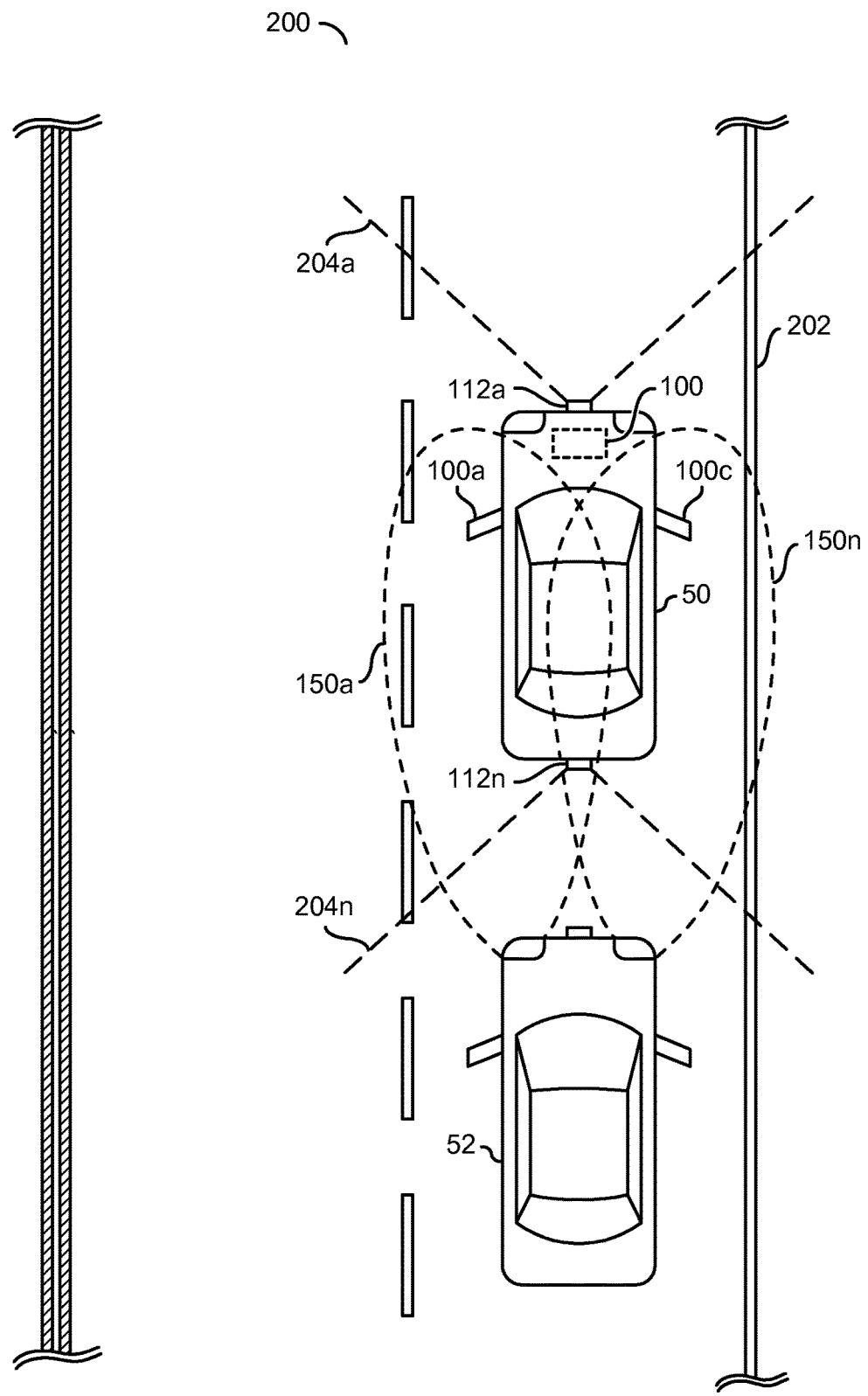
FIG. 4 is a diagram illustrating a lens capturing a pulsed light source from another vehicle.

Referring to FIG. 4, an example 200 of the lenses 112a-112n capturing a pulsed light source from another vehicle 52 is shown. The vehicle 50 is shown traveling a road 202 in front of another vehicle 52. The other vehicle 52 is shown emitting the pulsed light sources 150a-150n (e.g., from LED headlights). The pulsed light sources 150a-150n may be the detected objects. The vehicle 50 is shown having the electronic mirrors 110a and 110c.

The vehicle 50 is shown comprising the lenses 112a-112n. The lenses 112a-112n may be connected to the camera system 100 (e.g., the capture device 102 and/or 102'). The lens 112a is shown having a field of view (FOV) 204a capturing a targeted view in front of the vehicle 50. The lens 112n is shown having a FOV 204n capturing a targeted view behind the vehicle 50. The pulsed light sources 150a-150n are shown in the FOV 204n, allowing the camera system 100 to capture and/or classify the pulsed light sources 150a-150n.

Generally, a view from a traditional reflective side view mirror would allow a driver to see other vehicles near the vehicle 50. The vehicle 50 is shown comprising the electronic mirrors 110a and 110c. The electronic mirrors 110a and 110c may be configured to display an image/video to provide to the driver a view similar to (e.g., simulating and/or emulating) a view from a traditional reflective side view mirror. For example, the image/video (e.g., the signal VIDEO) captured by the camera system 100 from the FOV 204n may be processed (e.g., by the processor 104 and/or the processor 122). The processor 104 and/or the processor 122 may present signal (e.g., the signal OUTPUT) of a cropped version of the signal VIDEO to each of the electronic mirrors 110a-110n. Each cropped signal may correspond to a view for each electronic mirror 110a-110n simulating a view from a traditional sideview (or rearview) mirror. The cropped signal may correspond to a field of view configured to fit a shape of the displays 110a-110n (e.g., the shape of a traditional reflective mirror).

In some embodiments, the camera system 100 may be installed in the vehicle 50 at a time of manufacturing. For example, the camera system 100 may be installed on a particular type (e.g., model, make, year, etc.) of vehicle 50 and the camera system 100 may store pre-determined status information about the vehicle 50 (e.g., a size, seat positioning, range of view of the mirrors, known sizes of particular objects, etc.).

In some embodiments, the camera system 100 may be installed in the vehicle 50 as a separate component (e.g., an after-market part). In one example, the camera system 100 may be designed and/or sold for a particular make/model of the vehicle 50 and store pre-determined status information (e.g., in the memory 106). In another example, the camera system 100 may be programmable and the status information may be entered in the camera system 100 based on the status information of the vehicle 50. For example, an online database may be implemented with status information for various types of vehicles (e.g., make, model, year, etc.) and the status information may be downloaded and stored in the camera system 100. The implementation of the camera system 100 in the vehicle 50 and/or a method of storing information about the vehicle 50 may be varied according to the design criteria of a particular implementation.

The capture device 102 may capture video image data (e.g., from the lens 112). In some embodiments, the capture device 102 may be a video capturing device such as a camera. In some embodiments, the capture device 102 may be a component of a camera (e.g., a camera pre-installed in the vehicle 50). The capture device 102 may capture data received through the lens 112 to generate a bitstream (e.g., generate video frames). For example, the capture device 102 may receive light from the lens 112. The lens 112 may be directed at the environment surrounding the vehicle 50 to provide a targeted view from the vehicle 50.

The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the targeted view from the vehicle 50 may be represented as the signal/bitstream/data VIDEO (e.g., a digital video signal). The capture device 102 may present the signal VIDEO to the processor 104. The signal VIDEO may represent the video frames/video data. The signal VIDEO may be a video stream captured by the capture device 102. In some embodiments, the capture device 102 may be implemented in the camera. In some embodiments, the capture device 102 may be configured to add to existing functionality of the camera.

The capture device 102 may be installed in the vehicle 50 (e.g., in the interior of the car 50 directed outwards at the environment surrounding the vehicle 50). In some embodiments, the capture device 102 may be pre-installed in the vehicle 50 and the camera system 100 may connect to the capture device 102. In other embodiments, the capture device 102 may be part of the camera system 100. The camera system 100 may be configured to leverage pre-existing functionality of the pre-installed capture device 102. The implementation of the capture device 102 may be varied according to the design criteria of a particular implementation.

In some embodiments, the capture device 102 may implement a single camera providing a view of a radius around the vehicle 50 (e.g., a single camera configured to capture a 360 degree view and de-warp the captured video). In another example, the capture device 120 may be used to implement a surround view camera system (e.g., a 4-camera surround view system). For example, the lenses 112a-112n may be located on various parts of the vehicle 50 to provide different targeted views of the environment surrounding the vehicle. The type of capture device 102 may be varied according to the design criteria of a particular implementation.

In some embodiments, the capture device 102' may implement the sensor 120, the processor 122 and/or the frame buffer 124. The sensor 120 may receive light from the lens 112 and transform the light into digital data (e.g., the bitstream). For example, the sensor 120 may perform a photoelectric conversion of the light from the lens 112. The processor 122 may transform the bitstream into human-legible content (e.g., video data). For example, the processor 122 may receive pure (e.g., raw) data from the sensor 120 and generate (e.g., encode) video data based on the raw data (e.g., the bitstream). The capture device 102' may have the frame buffer 124 configured to store the raw data and/or the processed bitstream. For example, the capture device 102' may implement a frame memory and/or buffer 124 to store (e.g., provide temporary storage and/or cache) one or more of the video frames (e.g., the digital video signal). The processor 122 may perform analysis on the video frames stored in the frame buffer 124 of the capture device 102'.

In some embodiments, the capture device 102' may be configured to determine a location of the pulsed light sources 150a-150n. For example, the processor 122 may analyze the captured bitstream (e.g., using machine vision processing), determine a location of the pulsed light sources 150a-150n, classify the pulsed light sources 150a-150n (e.g., based on a color, based on a frequency of a duty cycle, based on a location, etc.) and present the signal VIDEO (e.g., comprising information about the classification of the pulsed light sources 150a-150n) to the processor 104. The processor 122 may be configured to determine the location of and/or classify the pulsed light sources 150a-150n (e.g., less analysis is performed by the processor 104). In another example, the processor 122 may generate the signal VIDEO comprising video frames and the processor 104 may analyze the video frames to determine the location and/or classification of the pulsed light sources 150a-150n (e.g., more analysis is performed by the processor 104). The analysis performed by the processor 122 and/or the processor 104 may be varied according to the design criteria of a particular implementation.

The processor 122 may be configured to control the sensor 120. For example, the processor 122 may elongate the exposure of the sensor 120. In another example, the processor 122 may adjust the exposure length of the sensor 120 and/or a timing of the exposure of the sensor 120. In yet another example, the processor 122 may adjust a gain for specific pixels and/or regions of the sensor 120. The processor 122 may store the processed data (e.g., the video frames of the signal VIDEO) in the frame buffer 124.

The processor 104 may be configured to execute computer readable code and/or process information. The processor 104 may be configured to receive input and/or present output to the memory 106. The processor 104 may be configured to present and/or receive other signals (not shown). The number and/or types of inputs and/or outputs of the processor 104 may be varied according to the design criteria of a particular implementation.

In some embodiments, the processor 104 may receive the signal VIDEO from the capture device 102 and detect and/or classify the pulsed light sources 150a-150n in the video frame. In some embodiments, the processor 122 may be configured to detect the pulsed light sources 150a-150n and the processor 104 may receive the location and/or classification of the pulsed light sources 150a-150n from the capture device 102'. In some embodiments, the processor 104 may be configured to analyze the video frame (e.g., the signal VIDEO). The processor 104 may be configured to detect a location and/or determine a classification of the pulsed light sources 150a-150n in the video frame. The information received by the processor 104 and/or the analysis performed by the processor 104 may be varied according to the design criteria of a particular implementation.

The processor 104 may be configured to implement machine-vision and/or video analysis to detect and/or classify objects (e.g., the pulsed light sources 150a-150n). The processor 104 may be configured to analyze video to locate (e.g., detect) the pulsed light sources 150a-150n. For example, the LED headlights may be the detected objects 150a-150n. The processor 104 may cross-reference the data from the signal VIDEO to determine whether any of the detected objects 150a-150n are classified as known exclude frequencies (e.g., turn signals, emergency lights, etc.). If any of the detected objects 150a-150n are classified as the known exclude frequencies, the processor 104 may not modify (e.g., ignore) the corresponding pixels (e.g., no masking/correction may be performed).

The processor 104 and/or the processor 122 may determine whether or not to modify the pixels corresponding to a subset of the detected objects 150a-150n. The processor 104 and/or the processor 122 may detect the flickering objects (e.g., the pulsed light sources 150a-150n). The processor 104 and/or the processor 122 may classify the pulsed light sources 150a-150n. For example, the pulsed light sources 150a-150n may be classified based on a frequency.

The processor 104 and/or the processor 122 may determine whether to perform a correction to or ignore (e.g., not apply a correction to) a subset of the pulsed light sources 150a-150n. For example, the processor 104 and/or the processor 122 may classify the frequency of the pulsed light source to be 25 Hz and apply the correction. In another example, the processor 104 and/or the processor 122 may classify the frequency of a subset of the pulsed light sources to be 2 Hz (e.g., a turn signal) and not apply the correction. The processor 104 and/or the processor 122 may determine whether or not the flickering effect of the detected objects 150a-150n should be corrected based on a criteria. The criteria may indicate that the detected objects (or a subset of the detected objects) 150a-150n are known to be intentionally flickering. For example, objects known to be intentionally flickering may comprise emergency services lights, turns signals, road flares, construction lights, road markers, etc. If the detected objects 150a-150n do not meet the criteria, the processor 104 and/or the processor 122 may leave the pixels unmodified for the intentionally flickering objects (e.g., ignore the detected objects 150a-150n). For example, the processor 104 and/or the processor 122 may maintain the flickering effect for the objects based on the criteria indicating the objects are known to be intentionally flickering. The criteria for correcting or ignoring (not correcting) the pulsed light sources 150a-150n may vary according to the design criteria of a particular implementation.

In some embodiments, the processor 104 and/or the processor 122 may determine whether to apply the correction or ignore the subset of the objects based on object recognition. For example, the memory 108 may store various objects for the camera system 100 to not apply correction (e.g., an exclusion list for objects such as emergency vehicles, road flares, lightning, construction lights, traffic lights, etc.). The processor 104 and/or the processor 122 may not apply the correction when the detected objects 150a-150n are determined to be an object on the exclusion list. In some embodiments, the processor 104 and/or the processor 122 may determine whether to apply the correction or ignore the object based on the observed flicker frequency. For example, a frequency of 300 MHz-700 MHz may be determined to be LED headlights and correction may be applied. In another example, a frequency for a turn signal may be a known exclude frequency. The processor 104 and/or the processor 122 may not apply correction to a known exclude frequency and/or a pulsed lights source 150a-150n having a frequency similar (e.g., close to) to the known exclude frequency.

Based on the location and/or classification of the pulsed light sources 150a-150n, the processor 104 may determine a correction implementation (e.g., a mask for the flickering effect). The processor 104 may modify a group of pixels in the signal VIDEO to mask the flickering effect. The processor 104 may generate the signal OUTPUT in response to the signal VIDEO and/or the classification of the pulsed light sources 150a-150n in the signal VIDEO.

The processor 104 may modify the signal VIDEO. The signal OUTPUT may be a cropped and/or adjusted version of the signal VIDEO. The signal OUTPUT may be a version of the signal VIDEO with a masked flickering effect. The signal OUTPUT may present a field of view configured to fit a shape of the display 110 simulating/emulating the reflective view from a traditional mirror. For example, the emulation and/or simulation performed by the processor 104 may implement a view similar to (or the same as) a view provided to a driver when looking at a traditional reflective mirror (e.g., a targeted view of behind and/or beside the vehicle 50). In one example, the signal OUTPUT may be sent by the display device 110 (e.g., the electronic mirror 110). The display device 110 may be configured to display the signal OUTPUT. In another example, the signal OUTPUT may be sent to the memory 106 for storage (e.g., buffering). In some embodiments, the signal OUTPUT may have the flickering effect for the first few frames (e.g., until the processor 104 completes the masking effect). In some embodiments, the signal OUTPUT may be buffered by the memory 106 until the processor 104 completes the masking effect. The implementation of the signal OUTPUT may be varied according to the design criteria of a particular implementation.

The processor 104 and/or the processor 122 may be implemented as an application specific integrated circuit (e.g., ASIC) or a system-on-a-chip (e.g., SoC). The processor 104 and/or the processor 122 may be configured to classify the pulsed light sources 150a-150n. For example, one of the pulsed light sources 150a-150n may be classified as having a distracting effect on the driver (e.g., the flickering of LED headlights, flickering with a range of 300 MHz-700 MHz, etc.). In another example, one of the pulsed light sources 150a-150n may be classified as an important visual aid for the driver (e.g., the blinking turn signal of the other vehicle 52, police lights, ambulance lights, road flares, construction lights, etc.). The types of classifications for the pulsed light sources 150a-150n may be varied according to the design criteria of a particular implementation.

The processor 104 and/or the processor 122 may detect the pulsed light source 150a-150n in each video frame. The processor 104 and/or the processor 122 may determine a number of pixels (e.g., a width and/or a height) comprising the pulsed light source 150a-150n in the video frames. Based on the number of pixels of the pulsed light sources 150a-150n in the video frame, the processor 104 and/or the processor 122 may track and/or estimate a movement of the pulsed light sources 150a-150n from frame to frame (e.g., to provide improved masking of the flickering effect). Whether the classification of the pulsed light sources 150a-150n is performed by the processor 104 and/or the processor 122 may be varied according to the design criteria of a particular implementation.

The memory 106 may store data. The memory 106 may be implemented as a cache, flash memory, frame buffer, DRAM memory, etc. The type and/or size of the memory 106 may be varied according to the design criteria of a particular implementation. The data stored in the memory 106 may correspond to the classification of the pulsed light sources 150a-150n. For example, the memory 106 may store a frequency for various pulsed light sources 150a-150n (e.g., turn signals, emergency lights, etc.). In some embodiments, the memory 106 may store video frames and/or information about groups of pixels to allow the processor 104 to track the pulsed light sources 150a-150n from frame to frame.

The memory 106 may store the pre-determined status information of the vehicle 50. For example, the status information of the vehicle 50 may be updated by overwriting the status information stored in the memory 106. In some embodiments, the memory 106 may store pre-defined preferences (e.g., a display intensity, a display angle, a display zoom level of the electronic mirrors 110a-110n) for each driver.

The lens 112 (e.g., a camera lens) may be directed at the environment surrounding the vehicle 50 (e.g., directed behind the vehicle to provide a targeted view corresponding to the sideview electronic mirrors 110a and 110c and/or the rearview electronic mirror 110b). For example, the lens 112 may be mounted on a rear end of the vehicle 50. In another example, the lens 112 may be mounted as part of a console of the vehicle 50 (e.g., to provide a front view of the vehicle). The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

The interface 114 may receive data from one or more components of the vehicle 50. The signal STATUS may be generated in response to the data received from the components of the vehicle 50. In some embodiments, the interface 114 may be optional for the operation of the camera system 100. In some embodiments, the interface 114 may receive data from the processor 104. The interface 114 may send data (e.g., instructions) from the processor 104 to the components of the vehicle 50. For example, the interface 114 may be bi-directional.

In some embodiments, the data received by the interface 114 from the components of the vehicle 50 may be a seat position, a seat recline position, an angle of the bottom seat cushion, a mirror orientation, a speed of the vehicle, any information available from an on-board diagnostics (OBD) port of the vehicle 50, etc. (e.g., presented to the processor 104 as the signal STATUS). The type of data and/or the number of components of the vehicle 50 that provide data may be varied according to the design criteria of a particular implementation.

Generally, a position of a traditional reflective mirror is adjustable using manual controls in the vehicle 50 available to the driver (e.g., buttons on a panel on the inside of the door beside the driver, buttons on a center console, an interface on a touchscreen, buttons on a steering wheel, etc.). Adjustments to the position may change a field of view available to the driver in the reflective view from the traditional mirror. The camera system 100 may adjust the display of the electronic mirrors 110a-110n automatically based on a field of view of the driver determined by the processor 104 (e.g., to simulate the reflective view of the traditional mirror). For example, the signal STATUS may be information about a field of view of the driver, and the processor 104 may crop and/or adjust the display of the electronic mirrors 110a-110n to provide a suitable view (e.g., a safe view, a relevant view, a view similar to a view provided by a traditional reflective mirror, etc.).

Each of the electronic mirrors 110a-110n may be connected to the camera system 100 (e.g., via the interface 114) to provide status information (e.g., the signal STATUS) to the processor 104 and/or the processor 122. The cropping and/or adjustment of the display of the electronic mirrors 110a-110n may be varied according to the design criteria of a particular implementation. For example, the signal OUTPUT may be cropped and/or adjusted version of the signal VIDEO. The signal STATUS may be used by the processor 104 to determine a field of view of the driver of the vehicle 50 (e.g., the field of view of the driver similar to a view from a traditional sideview and/or rearview mirror). The field of view of the signal OUTPUT may be based on the determined field of view corresponding to a view from a traditional mirror.

The interface 114 may be implemented as an electronic bus (e.g., a controller area network (CAN) bus). In another example, the interface 114 may be implemented as an Ethernet interface. In yet another example, the interface 114 may be implemented as an electronic device (e.g., a chip) with a CAN bus controller. In some embodiments, the electronic mirrors 110a-110n may connect directly to the processor 104 (e.g., the processor 104 may implement a CAN bus controller for compatibility, the processor 104 may implement a serial peripheral interface (SPI), the processor 104 may implement another interface, etc.).

Figure 5:
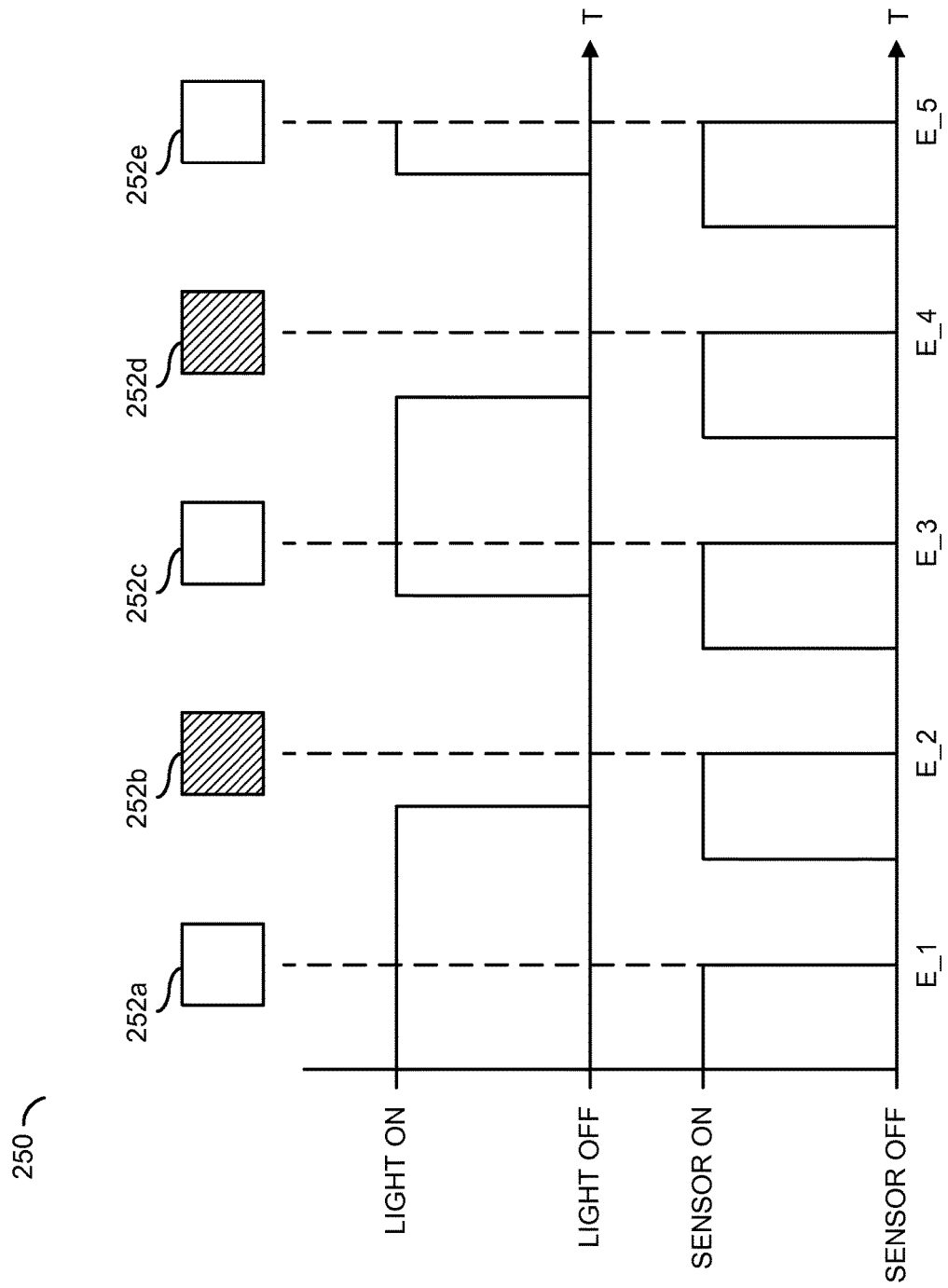
FIG. 5 is a diagram illustrating a timing of sensor exposures and a pulsed light source.

Referring to FIG. 5, a chart 250 illustrating a timing of sensor exposures and a pulsed light source is shown. The timing chart 250 shows the status (e.g., LIGHT ON and LIGHT OFF) of the pulsed light sources 150a-150n at a particular point in time. The timing chart 250 also shows the status (e.g., SENSOR ON and SENSOR OFF) of the capture device 102 (or the sensor 120) at a particular point in time. The timing chart 250 shows captured frames 252a-252e corresponding to the times E_1, E_2, E_3, E_4, and E_5.

Without correction (e.g., the masking performed by the camera system 100), if a shortest exposure of the sensor 120 is shorter than a cycle length of the detected objects 150a-150n (e.g., a cycle length of a LED headlight), the display devices 110a-110n may display the detected objects 150a-150n as sometimes on and/or sometimes off (e.g., flickering). Whether the detected objects 150a-150n are displayed as on or off may depend on whether the detected objects 150a-150n are sampled when the pulsed lights are on or off. Capturing the detected objects 150a-150n on and/or off during various samplings may result in flickering in the recorded video.

The frame 252a is shown as a bright frame. At the time E_1 when the capture device 102 (or the sensor 120) captures the frame 252a, the pulsed light sources 150a-150n have a LIGHT ON status. The frame 252b is shown as a dark frame. At the time E_2 when the capture device 102 (or the sensor 120) captures the frame 252b, the pulsed light sources 150a-150n have a LIGHT OFF status. The frame 252c is shown as a bright frame. At the time E_3 when the capture device 102 (or the sensor 120) captures the frame 252c, the pulsed light sources 150a-150n have a LIGHT ON status. The frame 252d is shown as a dark frame. At the time E_4 when the capture device 102 (or the sensor 120) captures the frame 252d, the pulsed light sources 150a-150n have a LIGHT OFF status. The frame 252e is shown as a bright frame. At the time E_5 when the capture device 102 (or the sensor 120) captures the frame 252e, the pulsed light sources 150a-150n have a LIGHT ON status. When the electronic mirrors 110a-110n display the frames 252a-252e in sequences, the frames 252a-252e alternate between bright and dark to create the flickering effect. The camera system 100 may be configured to detect the flickering effect and mask the flickering effect.

In some embodiments, the flicking problem may be eliminated by elongating the exposure of the sensor 120. However, the tradeoff is that parts of the captured image may become overexposed (e.g., a dynamic range of the image may be compressed). The camera system 100 may be configured to reduce a gain of the captured image to prevent the captured image from being overexposed. The camera system 100 may be configured to increase a gain of the captured image (e.g., when the pulsed light sources 150a-150n are sampled off).

The processor 104 and/or the processor 122 may be configured to analyze the signal VIDEO. The analysis performed by the processor 104 and/or the processor 122 may be configured to identify the objects 150a-150n (e.g., determine a location of the LED headlights and/or other pulsed light sources within the video image). Based on the determined location of the objects 150a-150n the pixels (e.g., a group of pixels) in the video signal (e.g., the group of pixels in consecutive frames) relating to the detected objects 150a-150n may be additionally processed.

The additional processing by the processor 104 and/or the processor 122 may be configured to mask flickering effects caused by the HDR processing. For example, the additional processing may comprise an averaging of brightness and/or luminance values of the relevant pixels over a number of frames. In some embodiments, the processed data may be stored in the frame buffer 124 of the processor 122 (e.g., the video processing SoC within the capture device 102'). In some embodiments, the video processing may be performed by the processor 104 (e.g., the display SoC in the display device 110') and used to modify a brightness and/or luminance level of the LCD pixels in the electronic mirror display 110'. The type of processing may be varied according to the design criteria of a particular implementation.

Figure 6:
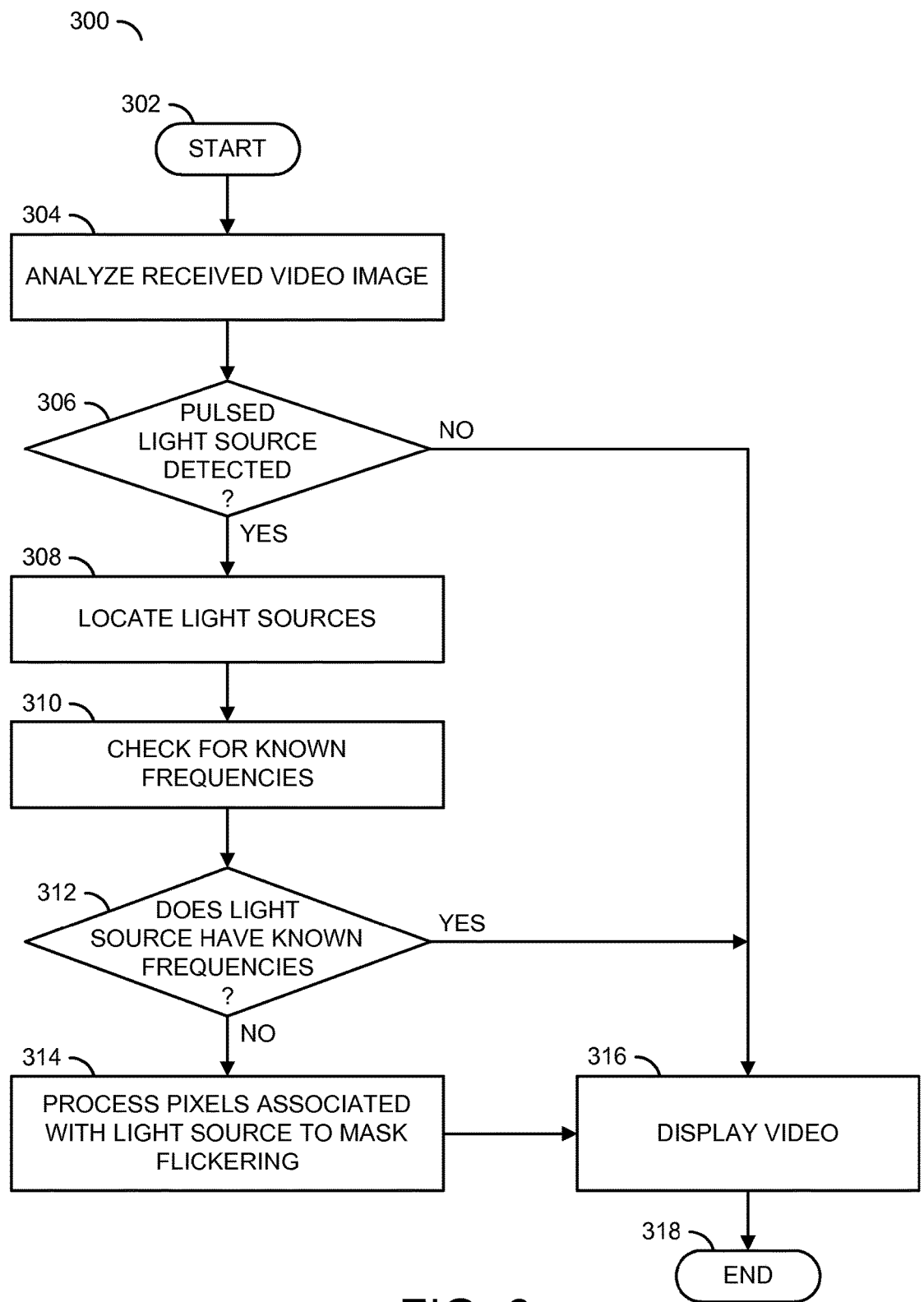
FIG. 6 is a flow diagram illustrating a method for reducing flickering from a pulsed light source in a video display.

Referring to FIG. 6, a method (or process) 300 is shown. The method 300 may reduce flickering from a pulsed light source in a video display 110. The method 300 generally comprises a step (or state) 302, a step (or state) 304, a decision step (or state) 306, a step (or state) 308, a step (or state) 310, a decision step (or state) 312, a step (or state) 314, a step (or state) 316, and a step (or state) 318. The state 302 may start the method 300. The state 304 may analyze the received video image (e.g., the signal VIDEO). Next, the method 300 may move to the decision state 306.

If the decision state 306 determines the pulsed light source (e.g., one of the detected objects 150a-150n) has not been detected, the method 300 may move to the state 316. If the decision state 306 determines the pulsed light source has been detected, the method 300 may move to the state 308. The state 308 may locate the light sources (e.g., the processor 104 and/or 122 may locate the pixels in the video frame representing a light source). The state 310 may check for known frequencies (e.g., classify the detected objects 150a-150n by checking for frequencies corresponding to turn signals, warning lights, emergency vehicle lights, etc.). Next, the method 300 may move to the decision state 312.

If the decision state 312 determines the light source does have known frequencies, the method 300 may move to the state 316. If not, method 300 may move to the state 314. The state 314 may process the pixels associated with the light source to mask the flickering effect. Next, the method 300 may move to the state 316. The state 316 may display the video (e.g., the electronic mirrors 110a-110n may display the signal OUTPUT). Next, the method 300 may end at the state 318.

Figure 7:
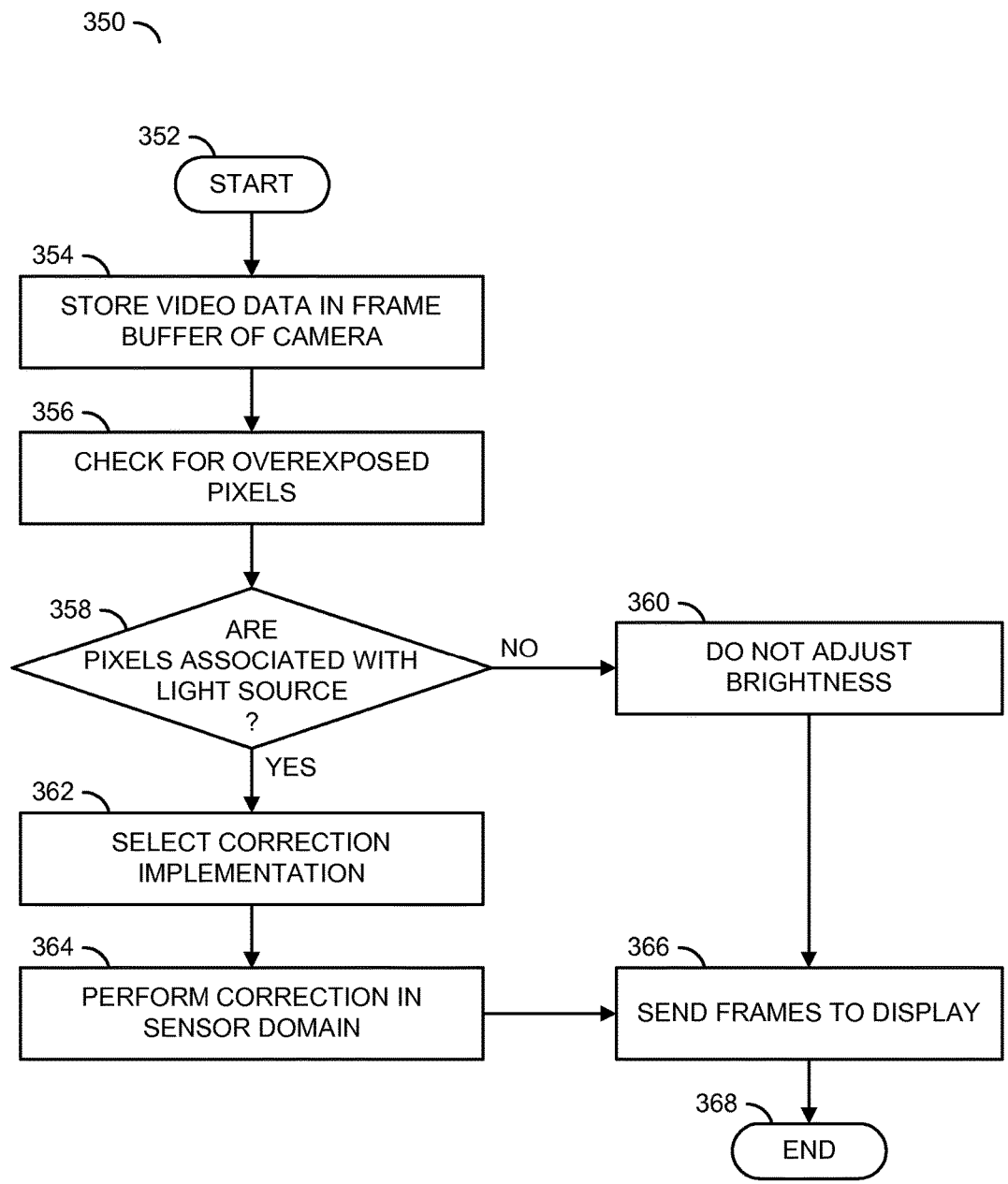
FIG. 7 is a flow diagram illustrating a method for performing a correction in a sensor domain.

Referring to FIG. 7, a method (or process) 350 is shown. The method 350 may perform a correction in a sensor domain. The method 350 generally comprises a step (or state) 352, a step (or state) 354, a step (or state) 356, a decision step (or state) 358, a step (or state) 360, a step (or state) 362, a step (or state) 364, a step (or state) 366, and a step (or state) 368.

The state 352 may start the method 350. Next, the state 354 may store the video data in the frame buffer 124 of the camera (e.g., the capture device 102'). The state 356 may check the video data for overexposed pixels. Next, the method 350 may move to the decision state 358.

If the decision state 358 determines the pixels are not associated with a light source, the method 350 may move to the state 360. The state 360 may not adjust the brightness (or luminance) of the pixels. Next, the method 350 may move to the state 366. If the decision state 358 determines the pixels are associated with a light source, the method 350 may move to the state 362. The state 362 may select a correction implementation. The state 364 may perform the correction in the sensor domain. Next, the method 350 may move to the state 366. The state 366 may send the frames to the display 110. Next, the method 350 may end at the state 368.

Figure 8:
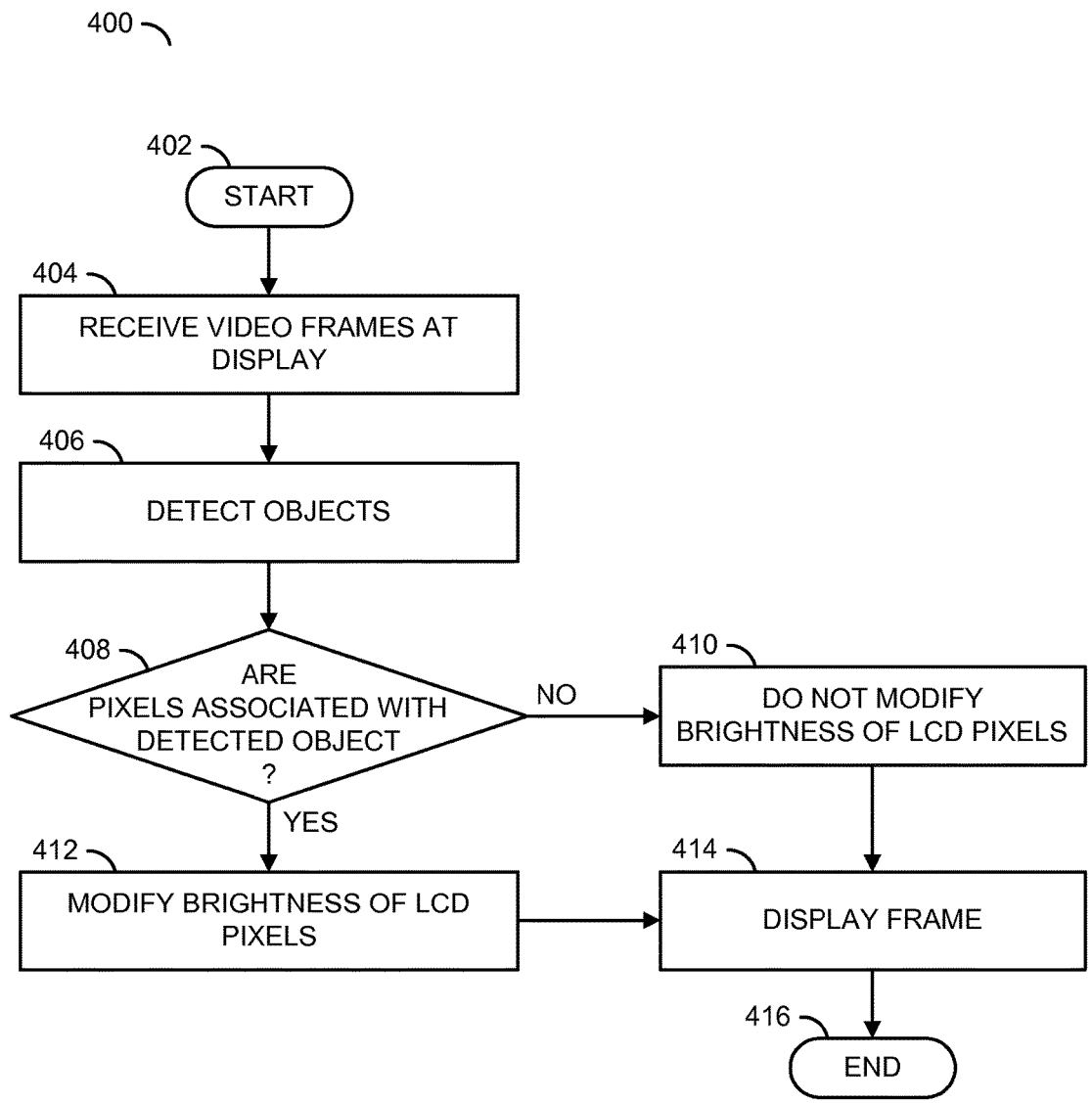
FIG. 8 is a flow diagram illustrating a method for modifying pixels in a display device.

Referring to FIG. 8, a method (or process) 400 is shown. The method 400 may modify pixels in the display device 110. The method 400 generally comprises a step (or state) 402, a step (or state) 404, a step (or state) 406, a decision step (or state) 408, a step (or state) 410, a step (or state) 412, a step (or state) 414, and a step (or state) 416.

The state 402 may start the method 400. Next, the state 404 may receive video frames at the display 110'. In the state 406, the processor 104 may detect objects (e.g., search for the pulsed light sources 150a-150n). Next, the method 400 may move to the decision state 408.

If the decision state 408 determines the pixels of the video frame are not associated with one of the detected objects 150a-150n, the method 400 may move to the state 410. The state 410 does not modify the brightness (or luminance) of the LCD pixels. Next, the method 400 may move to the state 414. If the decision state 408 determines the pixels of the video frame are associated with one of the detected objects 150a-150n, the method 400 may move to the state 412. The state 412 may modify the brightness (or luminance) of the LCD pixels. Next, the method 400 may move to the state 414. The state 414 may display the frame. Next, the method 400 may end at the state 416.

Figure 9:
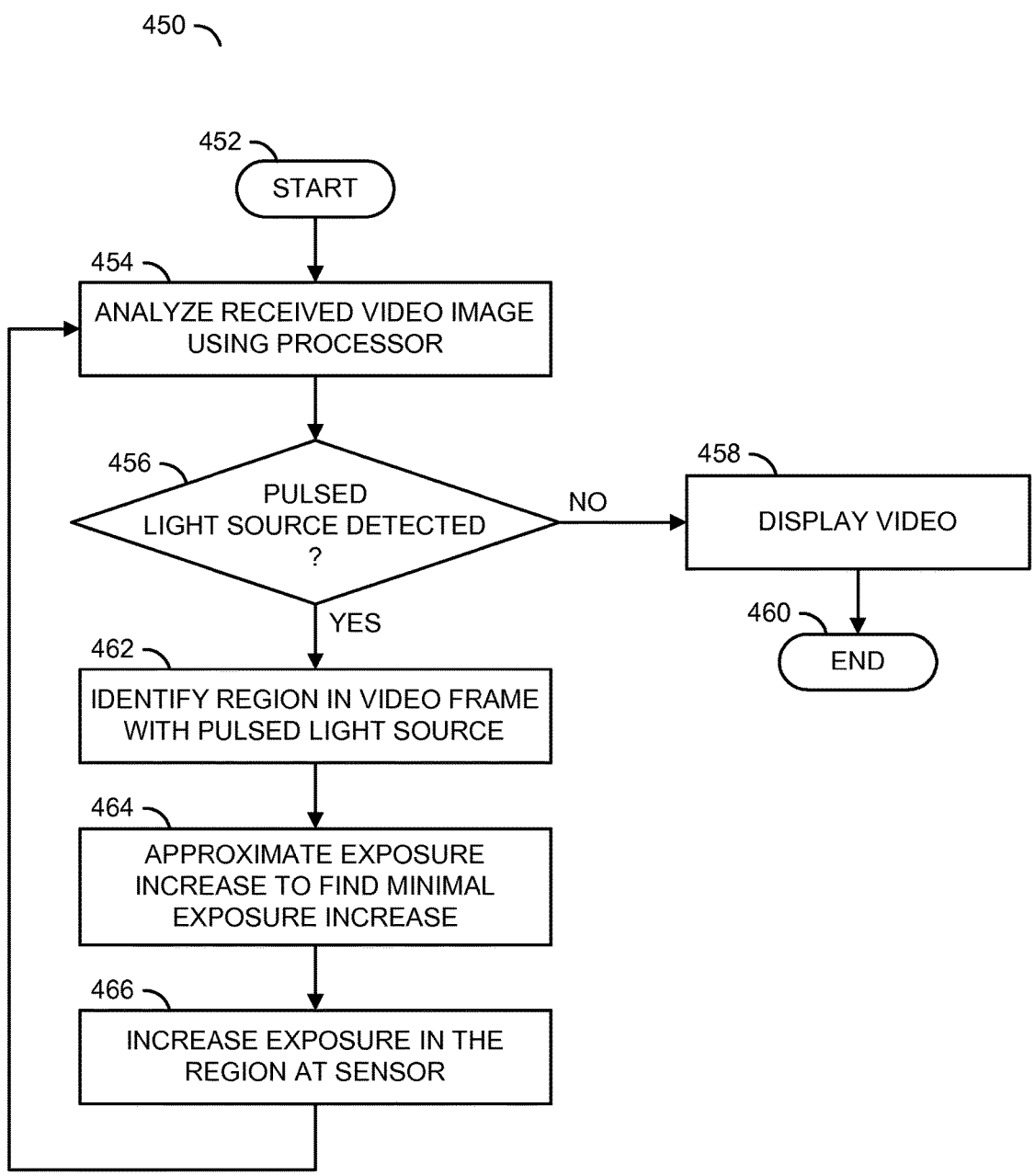
FIG. 9 is a flow diagram illustrating a method for performing an iterative correction of flickering.

Referring to FIG. 9, a method (or process) 450 is shown. The method 450 may perform an iterative correction of flickering. The method 450 generally comprises a step (or state) 452, a step (or state) 454, a decision step (or state) 456, a step (or state) 458, a step (or state) 460, a step (or state) 462, a step (or state) 464, and a step (or state) 466.

The state 452 may start the method 450. The state 454 may analyze the received video image (e.g., the signal VIDEO) using the processor 104. Next, the method 400 may move to the decision state 456.

If the decision state 456 determines one of the pulsed light sources 150a-150n has not been detected, the method 450 may move to the state 458. The state 458 may display the video (e.g., using the display device 110). Next, the method 450 may move to the state 460. The state 460 may end the method 450.

If the decision state 456 determines one of the pulsed light sources 150a-150n has been detected, the method 450 may move to the state 462. The state 462 may identify a region in the video frame (e.g., a group of pixels) with the pulsed light sources 150*a*-150*n*. Next, the state 464 may approximate an exposure increase to find a minimal exposure increase. The state 466 may increase the exposure in the region at the sensor 120. Next, the method 450 may return to the state 454.

The camera system 100 may be configured to perform many possible levels of detection of the pulsed light sources 150*a*-150*n* and/or many possible levels of correction of the flickering effect. In some embodiments, the signal VIDEO may be presented by the capture device 102. The signal VIDEO may be received by the processor 104 for analysis. The processor 104 may present the signal OUTPUT. The signal OUTPUT may be presented to a storage system (e.g., the memory 106 and/or an external memory storage system), the display device 110 and/or a separate display device 110'.

In some embodiments, the detection of the pulsed light sources 150*a*-150*n* may be performed in the sensor domain. For example, in the sensor domain the pulsed light sources 150*a*-150*n* may be detected based on analysis of overexposed pixels. The analysis in the sensor domain may be performed by the processor 122. The processor 122 may be coupled with the sensor 120 of the capture device 102'.

In some embodiments, the detection of the pulsed light sources 150*a*-150*n* may be performed in the processor domain. For example, in the processor domain the pulsed light sources may be detected based on outlines of a light source and/or recognition of a flickering region of a frame. The detection may exclude known and/or standard frequencies (e.g., the frequency associated with a turn signal). The analysis in the processor domain may be performed by the processor 104 and/or the processor 122. For example, the processor 104 and/or the processor 122 may be configured to implement machine vision analysis of the signal VIDEO.

In some embodiments, the correction of the flickering effect may be performed in the sensor domain. The camera system 100 may be configured to select one or more of the correction implementations. Generally, the correction implementations are mutually exclusive options. One example of a correction implementation in the sensor domain may be performed by the processor 122 configuring the sensor 120 to take multiple consecutive short exposures and averaging them out (e.g., average out the pixel values of each pixel between the short exposures). Another example of a correction implementation in the sensor domain may be the processor 122 configuring the sensor 120 to modify a gain value for specific pixels and/or regions of the frame (e.g., modify a local gain value for the region corresponding to the pulsed light sources 150*a*-150*n*). Yet another example of a correction implementation in the sensor domain may be performed by the processor 122 configuring the sensor 120 to increase a shortest exposure for specific pixels and/or regions of the frame. The types of correction implementations in the sensor domain may be varied according to the design criteria of a particular implementation.

The camera system 100 may implement the correction implementation to adjust and/or modify a gain value on a frame-by-frame basis. Generally, the camera system 100 is configured to cancel the flickering effect (e.g., an oscillation between two or more different luminance levels of a group of pixels from frame-to-frame). In some examples, when one of the pulsed light sources 150*a*-150*n* sampled is on (or above a pre-determined threshold value) the gain value of the corresponding group of pixels may be reduced. In some examples, when one of the pulsed light sources 150*a*-150*n* sampled is off (or below a pre-determined threshold value) the gain value of the corresponding group of pixels may be increased. Whether the processor 104 and/or the processor 122 determines to increase or decrease the gain value may vary depending on the status of the pulsed light sources 150*a*-150*n* in each frame.

In some embodiments, the correction of the flickering effect may be performed in the processor domain. The camera system 100 may be configured to select one or more of the correction implementations. Generally, the correction implementations are mutually exclusive options. One example of a correction implementation in the processor domain may be performed by the processor 104 calculating an average of pixel values between consecutive frames (e.g., modifying the pixels in a region to be an average value of the same pixel from the last N frames). Another example of a correction implementation in the processor domain may be performed by the processor 104 calculating average pixel values corresponding to a specific recognized object in consecutive frames (e.g., by tracking the movement of the detected objects 150*a*-150*n* from frame to frame and modifying the pixel values corresponding to the same portion of the detected objects 150*a*-150*n* to be an average value from the last N frames). Yet another example of a correction implementation in the processor domain may be performed by the processor 104 clipping luminance values from the top or the bottom (e.g., setting upper and lower luminance bounds on all pixels in the region corresponding to pulsed light sources 150*a*-150*n* to reduce flickering to a narrower range). The types of correction implementations in the processor domain may be varied according to the design criteria of a particular implementation.

In some embodiments, the correction of the flickering effect may be performed in the separate display device 110'. The separate display device 110' is shown having the processor 104 and/or the memory 106. The separate display device 110' may use correction implementations similar to the correction implementations of the processor domain using the processor 104 implemented as part of the separate display device 110'. For example, the capture device 102' may send the signal VIDEO to the separate display device 110'. The processor 104 of the separate display device 110' may perform analysis on the signal VIDEO, mask the flickering and present (or display) the signal OUTPUT.

In some embodiments, the correction of the flickering effect may be performed in the display device 110. The display device 110 may receive the signal OUTPUT from the processor 104. The signal OUTPUT may provide information about specific pixels and/or regions of each frame. The display 110 may read the signal OUTPUT and perform a local dimming and/or implement backlight changes in specific pixels and/or regions of the frame corresponding to the pulsed light sources 150*a*-150*n*.

In some embodiments, the camera system 100 may implement an iterative approach to masking the flickering effect. The processor 104 and/or the processor 122 may recognize one or more flickering regions in the frame (e.g., detect the pulsed light sources 150*a*-150*n*). For example, the processor 104 and/or the processor 122 may recognize and/or track objects (e.g., a group of pixels) in the frames and/or determine if flickering occurs anywhere in the frame. The processor 122 may adjust the sensor 120. For example, the exposure of the sensor 120 may be increased in regions corresponding to the detected objects 150*a*-150*n*. In another example, the exposure of the sensor 120 may be increased for the entire frame. An amount of increase for the exposure of the sensor 120 may be determined based on an approximation (e.g., a best guess). After the adjustment, the processor 104 and/or the processor 122 may attempt to recognize a flickering region in the frame and adjust the exposure of the sensor 120 until the processor 104 and/or the processor 122 determines the flicker has disappeared. The camera system 100 may apply the increased exposure and/or modified gain solution iteratively until the flickering effect disappears. For example, the increased exposure may be implemented by increasing the exposure of the frame (or the group of pixels corresponding to the recognized objects 150a-150n) in a single-exposure capture. In another example, the increased exposure may be implemented by increasing the shortest exposure of the frame (or the group of pixels corresponding to the recognized objects 150a-150n) in a multiple-exposure HDR capture. The implementation of the increased exposure may be varied according to the design criteria of a particular implementation.

The approximation for the increase for the exposure of the sensor 120 may be calculated based on root finding techniques and/or iterative approximation methods (e.g., a Newton-Raphson, Householder and/or Halley root finding technique). The root finding technique and/or iterative approximation method may be selected to minimize the number of iterations sufficient to find the minimal exposure change that will eliminate and/or adequately reduce the flickering effect.

The camera system 100 may be configured to determine the flicker correction (e.g., the masking of the flickering effect) without the use of the status information (e.g., from the signal STATUS). For example, the camera system 100 may be configured to implement the flicker correction without a physical connection to the vehicle 50. The camera system 100 may be implemented as a standalone camera device. The implementation of the camera system 100 may be varied according to the design criteria of a particular implementation.

The camera system 100 may be configured to compensate for various types of the classified objects 150a-150n. For example, when the pulsed light sources 150a-150n are classified as a bright object, the camera system 100 may compensate for bright portions by modifying the corresponding groups of pixels. In another example, when the pulsed light sources 150a-150n are classified as a dark object, the camera system 100 may compensate for dark portions by modifying the corresponding groups of pixels. Generally, an averaging correction implementation by the camera system 100 may affect all types of pixels (e.g., both bright and dark pixels) based on the analysis performed.

The video processing performed by the apparatus 100 may be applicable to any video capturing and/or live streaming device that captures a light source having a periodic frequency. For example, in automotive applications, the apparatus 100 may be implemented for electronic rearview mirrors, electronic side mirrors, surround view (birdseye and/or 3D), backup cameras, black-box recorders, etc. In another example, in home video recording applications, the apparatus 100 may be implemented in point-and-shoot cameras, hand-held video recorders, portable action cameras, home-surveillance cameras, home-surveillance displays, etc. In yet another example, in environment recording applications, the apparatus 100 may be implemented in trail cameras, surveillance cameras, wildlife cameras (e.g., zoo cameras, portable animal-worn cameras, etc.), underwater cameras, etc. The type of application making use of the apparatus 100 may be varied according to the design criteria of a particular implementation.

The functions performed by the diagrams of FIGS. 6-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
 a sensor configured to generate a first video signal based on a targeted view from a vehicle; and
 a processor configured to (A) classify objects detected in said first video signal to determine a location and a region of pixels to modify within a frame of the first video signal, (B) execute steps for modifying said region of pixels in said first video signal, said steps comprising (i) searching for a flickering effect in said frame, (ii) determining a correction for said sensor based on said flickering effect in said frame, (iii) determining whether said flickering effect has been masked and (iv) repeating steps (i)-(iii) if said flickering effect has not been masked, (C) perform said correction of said region of pixels in said first video signal by executing at least one of (i) determining average values of pixels based on said location of said region of pixels over consecutive frames of said first video signal, (ii) determining average values of pixels corresponding to a location of said object over consecutive frames of said first video signal and (iii) clipping values of said pixels of said first video signal based on a predetermined range and (D) generate a second video signal in response to (i) said classified objects and (ii) said first video signal, wherein said second video signal presents (i) a field of view configured to fit a shape of a display emulating a reflective view from a mirror and (ii) a modified version of said region of pixels of said first video signal to mask said flickering effect of said classified objects present in said first video signal when viewing said second video signal on said display.

2. The apparatus according to claim 1, wherein (i) said classified objects comprise pulsed light sources and (ii) said region of pixels is less than all of said pixels in each frame of said first video signal.

3. The apparatus according to claim 2, wherein at least one of said pulsed light sources comprise headlights.

4. The apparatus according to claim 1, wherein (i) said display is implemented as an electronic mirror and (ii) said second video signal presents a reduced LED flickering.

5. The apparatus according to claim 1, wherein said second video signal is a cropped version of said first video signal.

6. The apparatus according to claim 5, wherein said second video signal presents one or more portions of said first video signal where each portion is cropped to fit a corresponding size and view for each display of said vehicle.

7. The apparatus according to claim 1, wherein said pixels in said region are modified based on an average luminance over a number of said frames in said first video signal.

8. The apparatus according to claim 1, further comprising an interface configured to receive status information about one or more components of said vehicle, wherein said second video signal is further generated in response to said status information.

9. The apparatus according to claim 1, wherein said flickering effect is masked by at least one of (a) local dimming and (b) backlight changes of pixel regions of said display corresponding to said region of pixels.

10. The apparatus according to claim 1, wherein said processor is configured to mask said flickering effect at said sensor by executing at least one of (i) configuring said sensor to perform a plurality of short exposures and determining an average for each pixel location over said plurality of short exposures, (ii) modifying a gain for said region of pixels corresponding to said objects, and (iii) configuring said sensor to increase a shortest exposure for said region of pixels corresponding to said objects.

11. The apparatus according to claim 1, wherein said processor is further configured to (i) recognize said object in a frame of said first video signal, and (ii) determine said correction for said sensor based on characteristics of said object.

12. The apparatus according to claim 1, wherein said correction for said sensor is at least one of (a) increasing a shortest exposure for said region of pixels in a multiple-exposure high-dynamic-range capture, (b) increasing an exposure for said region of pixels in a single-exposure capture and (c) modifying a gain for said region of pixels.

13. The apparatus according to claim 12, wherein said exposure is determined using an iterative approximation method to find a minimal correction for masking said flickering effect.

14. The apparatus according to claim 1, wherein said correction for said sensor is at least one of (a) increasing a shortest exposure for said frame in a multiple-exposure high-dynamic-range capture, (b) increasing an exposure for said frame in a single-exposure capture and (c) modifying a gain for said frame.

15. The apparatus according to claim 1, wherein said flickering effect is caused by a duty cycle of a light source.

16. The apparatus according to claim 1, wherein said classification of objects comprises (a) determining if a subset of said objects should be ignored based on a criteria indicating said subset of said objects is known to be intentionally flickering and (b) leaving said pixels unmodified for said intentionally flickering objects.

17. A method for reducing a flickering effect in a video, comprising the steps of:
 generating a first video signal based on a targeted view from a vehicle;
 classifying objects detected in said first video signal to determine a location and of a region of pixels to modify within a frame of the first video signal;
 modifying said region of pixels in said first video signal, wherein said modifying comprises (i) searching for said flickering effect in said frame, (ii) determining a correction for a sensor based on said flickering effect in said frame, (iii) determining whether said flickering effect has been masked and (iv) repeating steps (i)-(iii) if said flickering effect has not been masked;
 perform a correction of said region of pixels in said first video signal by executing at least one of (i) determining average values of pixels based on said location of said region of pixels over consecutive frames of said first video signal, (ii) determining average values of pixels corresponding to a location of said object over consecutive frames of said first video signal and (iii) clipping values of said pixels of said first video signal based on a predetermined range; and
 generating a second video signal in response to (i) the classified objects and (ii) the first video signal, wherein said second video signal presents (a) a field of view configured to fit a shape of a display emulating a reflective view from a mirror and (b) said modified region of pixels of said first video signal to mask said flickering effect of said classified objects present in said first video signal when viewing said second signal on said display.

\* \* \* \* \*